Figure 2:
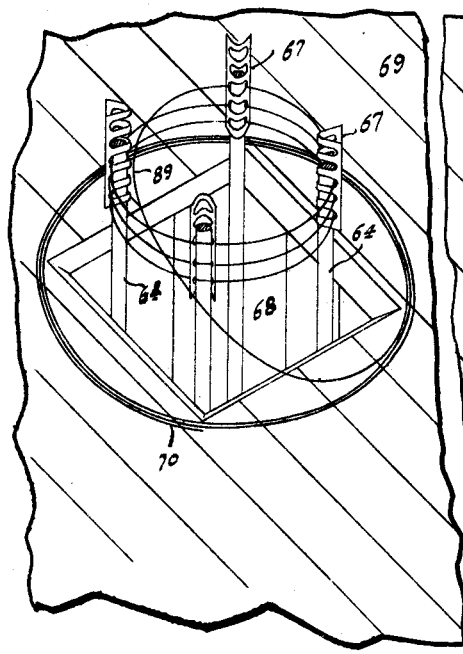

D. B. LUTEN.
PROCESS OF MANUFACTURING REINFORCEMENT FOR CONCRETE COLUMNS.
APPLICATION FILED APR. 16, 1913.

1,186,111.	Patented June 6, 1916.

WITNESSES:
Frank A. Pahle
Josephine Casper

INVENTOR.
Daniel B. Luten,
BY
Arthur M. Hood
ATTORNEY.

UNITED STATES PATENT OFFICE.

DANIEL B. LUTEN, OF INDIANAPOLIS, INDIANA.

PROCESS OF MANUFACTURING REINFORCEMENT FOR CONCRETE COLUMNS.

1,186,111. Specification of Letters Patent. Patented June 6, 1916.

Original application filed December 11, 1908, Serial No. 467,095. Divided and this application filed April 16, 1913. Serial No. 761,598.

*To all whom it may concern:*

Be it known that I, DANIEL B. LUTEN, a citizen of the United States, residing at Indianapolis, in the county of Marion and State of Indiana, have invented a new and useful Process of Manufacturing Reinforcement for Concrete Columns, of which the following is a specification.

My invention relates to a process of manufacturing reinforcement for concrete columns, and has for its purpose to provide a means of producing such reinforcement in place without delaying the building operations.

The present application constitutes a division of an application filed by me Dec. 11, 1908, Serial No. 467,095.

The invention is illustrated in the accompanying drawings, in which the same reference characters describe like parts throughout the several views.

Figure 1:
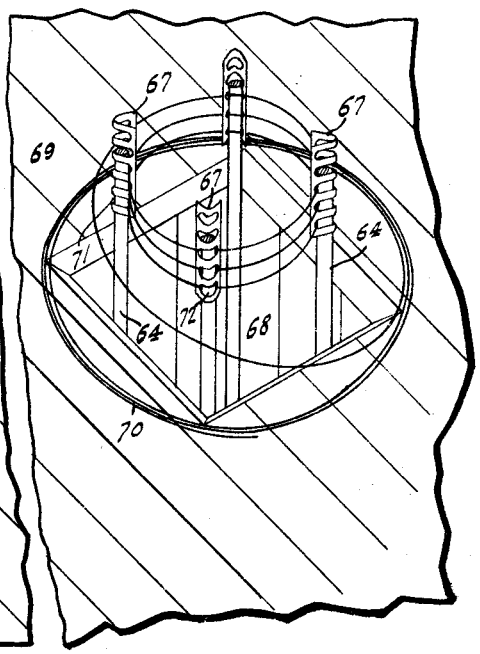
Figure 3:
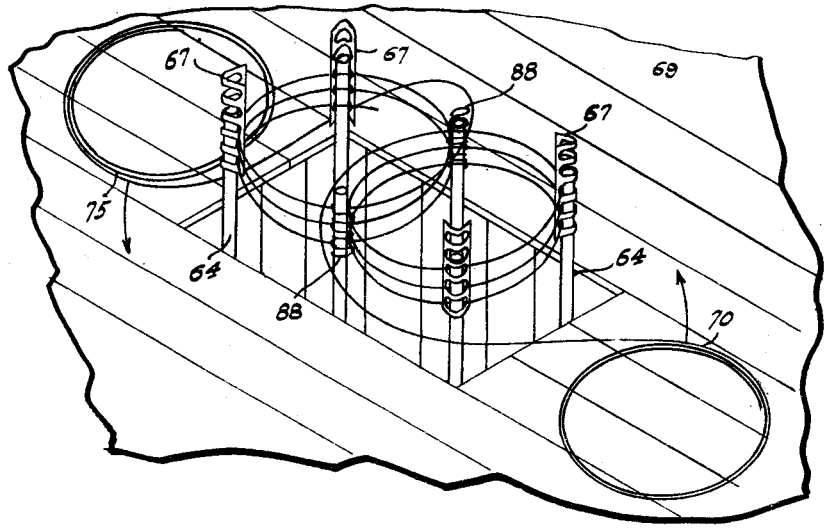

Figures 1 and 2 are perspective views showing the method of forming the reinforcement, and Fig. 3 is a perspective illustrating a method of forming a multiple reinforcement for a column, of greater width than thickness.

It has heretofore been customary to manufacture column reinforcement and then raise it to place, after which the forms were erected around the reinforcement preparatory to placing concrete. When a hooping reinforcement has been used, it has usually been necessary to wind the hooping transversely upon a wooden forming cylinder to which the longitudinal members were first attached, and then connect the transverse hoops to the longitudinals, after which the completed reinforcement was removed from the forming cylinder and placed in position for embedment in the proposed column. That process is not only tedious and expensive, but it necessitates the placing of the steel for columns before the erection of forms. Such procedure of necessity delays the construction of a building, because the steel workers are continually in the way of the carpenters. My present method obviates this difficulty in the following manner: As shown in Fig. 1 I first erect the forms for the column, and then place the longitudinal reinforcement, after which I weave the hooped reinforcement on the longitudinals from the top. Thus the forms 68 are shown for the column and forms or centering 69 for the floor, with the longitudinals 64 projecting from the forms. A coil of hooping 70 is so arranged as to be readily placed about the longitudinals. The end of the coil is passed through one of the perforations 71 in a clamp 67, which is then passed over the end of one of the longitudinal rods 64. The hooping is then passed into the perforation 72 of another clamp 67 over the adjacent longitudinal rod 64, continuing thus around the column. Upon again reaching the first clamp, the spiral enters the second perforation in that clamp, and so on for all the others, the pitch of the spiral being thus determined by the spacing of the perforations in the clamps. It would of course be difficult to perform this operation with clamps of the entire lengths of the rods, and the clamps are therefore made up of short lengths, say one to two feet each, and as the spiral is worked into a short length of clamp, it is forced downward on the longitudinal and new lengths of clamp are added. In this way the hooping reinforcement is woven at the top and slides down the longitudinals until the entire column reinforcement of longitudinal rods is bound about with a clamped hooping from bottom to top.

For a column having corners, it is desirable that the longitudinals 64 occupy the corners, and in such cases the hooping 70, would preferably be arranged inside the longitudinals. This is readily accomplished as shown in Fig. 1 by arranging the clamps 67 outside the rods 64 and the hooping inside. In some cases, however, it may be desirable to have the longitudinals inclosed by the hooping, and the modified method for accomplishing this is shown in Fig. 2. For this it is necessary only to reverse the clamps and to pass the coil over the top of each clamp 67 as it is reached, and then downward, as at 89, to its proper perforation in the clamp.

In Fig. 3 the method is illustrated in connection with a double reinforcement for a widened column, and in this case one set of longitudinals serves in common for both reinforcements. A modified clamp 88 is used on these common longitudinals, consisting of a closed ring of wire bent to inclose the transverse reinforcement and the longitudinal in the same manner as a single perforation of the sheet metal clamp. The hoops of one set of reinforcement alternate with the hoops of the other set on these common longitudinals. Sheet metal clamps 67 on the other longitudinals maintain the form and pitch of the reinforcement. In this system of double reinforcement, the coils 70 or 75 may be placed as shown in Fig. 3, and as each strand is carried to the longitudinals, it may be inverted over the latter thus taking its proper place and alternating with hoops from the other coil, producing an interdigitating of hoops that may be extended to any number of such reinforcements in a series in a column or wall. This method of arranging the coil and inverting each strand may of course be employed in the single reinforcements shown in Figs. 1 and 2, instead of the arrangement there shown.

If in the double reinforcement, it be desired to pass one loop through the other corresponding loop it may readily be accomplished by carrying the coils 70 and 75 around the column, (see the arrows in Fig. 3), as the strands are unwound from the coils and hooped about the longitudinals.

It is of course essential in performing this process of weaving the reinforcement, that the longitudinals be held in substantial parallelism, and that the clamps all have sufficient play to slide, preferably freely, upon them. By this method of forming the reinforcement, I am enabled to erect the forms for all columns and floors before placing the steel. Then, while the steel for the floor reinforcement is being placed, the steel for the columns may also be placed, and the hooping woven on the longitudinals without delaying either the erection of forms or the placing of steel; thus facilitating organization and speed in action. It is moreover much more economical of time and expense than the old method of first forming the reinforcement and then placing it.

I claim:—

1. That improvement in the art of producing a column of reinforced hardening plastic which comprises the placing of longitudinal reinforcing members substantially in position for embedment in the column, the association therewith of a reinforcing member extending transversely adjacent such longitudinal members, connecting the longitudinal and transverse members by a connecting member, and sliding such connecting member and transverse member longitudinally of the longitudinal member to make room for a succeeding transverse member and connecting member, and subsequently embedding in a hardening plastic the reinforcing structure thus formed.

2. That improvement in the art of producing a reinforced column of hardening plastic comprising the placing of longitudinal reinforcing members substantially in position for embedment in the column, associating therewith receiving clips adapted to embrace the longitudinal members and associating a reinforcing helix with such clips, and then moving the clips longitudinally of the longitudinal members to carry the helix between the clips and the corresponding longitudinal members to retain the same, and subsequently embedding the reinforcing structure thus formed within a body of hardening plastic.

3. That improvement in the art of producing a column of reinforced plastic which comprises the placing of longitudinal reinforcing members substantially in position for embedment in the column, the association therewith of receiving members longitudinally movable thereon, and the association with said receiving members of a helix of reinforcing material passed over the ends of the longitudinal members and slipped, together with the receiving members, longitudinally of the longitudinal members, and embedding such reinforcing structure in a hardening plastic.

4. That improvement in the art of reinforcing a concrete column comprising placing longitudinal reinforcing members in an upright position, then weaving a hooping around the ends of the longitudinals and securing such hooping to each longitudinal by a sliding clamp, then moving the hooping down the longitudinal members to place, and subsequently embedding in concrete.

5. That improvement in the art of producing a reinforced column of hardening plastic, comprising the placing of longitudinal reinforcing members substantially in position for embedment in the column, associating therewith receiving clips adapted to embrace the longitudinal members and associating a reinforcing helix with such clips with the longitudinal members on the exterior of such helix, and then moving the clips longitudinally of the longitudinal members to carry the helix between the clips and the corresponding longitudinal members to retain the same, with the longitudinal members still on the exterior of the helix, and subsequently embedding the reinforcing structure thus formed within a body of hardening plastic.

6. That improvement in the art of reinforcing a concrete column, comprising placing longitudinal reinforcing members in an upright position, then weaving a hooping around the ends of the longitudinals but inside of the figure formed by the longitudinals and securing such hooping to each longitudinal by a sliding clamp, and then moving the hooping down the longitudinal members to place inside of the figure formed by such members, and subsequently embedding in concrete.

In witness whereof, I have hereunto set my hand at Indianapolis, Indiana, this 22nd day of March, A. D. one thousand nine hundred and thirteen.

DANIEL B. LUTEN.

Witnesses:
FRANK A. FAHLE,
G. B. SCHLEY.

Copies of this patent may be obtained for five cents each, by addressing the "Commissioner of Patents, Washington, D. C."